(12) United States Patent
Dunk

(10) Patent No.: US 8,532,142 B2
(45) Date of Patent: Sep. 10, 2013

(54) SYSTEM AND METHOD FOR DELIVERY OF PACKETS

(75) Inventor: Craig Allan Dunk, Guelph (CA)

(73) Assignee: BlackBerry Limited, Waterloo (CA)

( * ) Notice: Subject to any disclaimer, the term of this patent is extended or adjusted under 35 U.S.C. 154(b) by 175 days.

(21) Appl. No.: 13/074,541

(22) Filed: Mar. 29, 2011

(65) Prior Publication Data

US 2011/0170407 A1 Jul. 14, 2011

Related U.S. Application Data

(63) Continuation of application No. 10/787,201, filed on Feb. 27, 2004, now Pat. No. 7,940,796.

(51) Int. Cl.
*H04J 3/16* (2006.01)

(52) U.S. Cl.
USPC . 370/469; 370/468; 370/395.21; 370/395.52; 370/332

(58) Field of Classification Search
None
See application file for complete search history.

(56) References Cited

U.S. PATENT DOCUMENTS

| 5,926,468 | A  | * | 7/1999 | Chapman et al. | 370/328 |
| 6,912,387 | B2 | * | 6/2005 | Haas et al. | 455/426.1 |
| 7,032,153 | B1 | * | 4/2006 | Zhang et al. | 714/749 |
| 7,486,634 | B2 | * | 2/2009 | Itoh | 370/318 |
| 2004/0151136 | A1 | * | 8/2004 | Gage | 370/328 |

OTHER PUBLICATIONS

Dunk, Craig Allan "System and Method for Delivery of Packets" U.S. Appl. No. 10/787,201, filed Feb. 27, 2004.

* cited by examiner

*Primary Examiner* — Kibrom T Hailu
(74) *Attorney, Agent, or Firm* — Perry + Currier Inc.; Kristjan Spence

(57) ABSTRACT

A system and method for delivery of packets is provided. In an embodiment, a client is operable to query a first layer of the protocol stack used to provide a link that carries packets for said client. Based on the query, the client is operable to adjust how those packets are delivered over another layer of the protocol stack in order to help improve the likelihood of successful delivery of those packets.

27 Claims, 18 Drawing Sheets

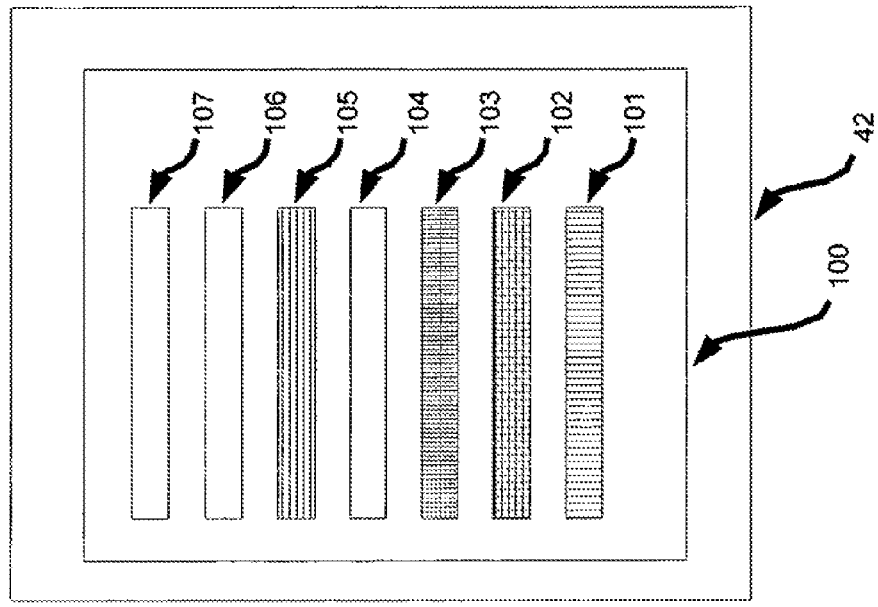
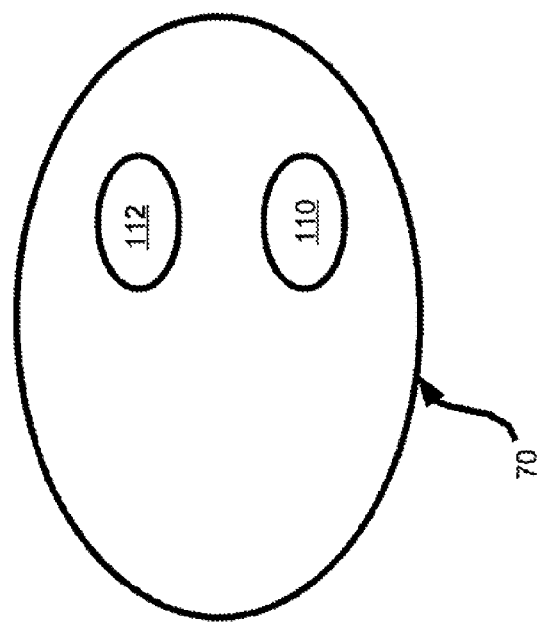
Fig.2

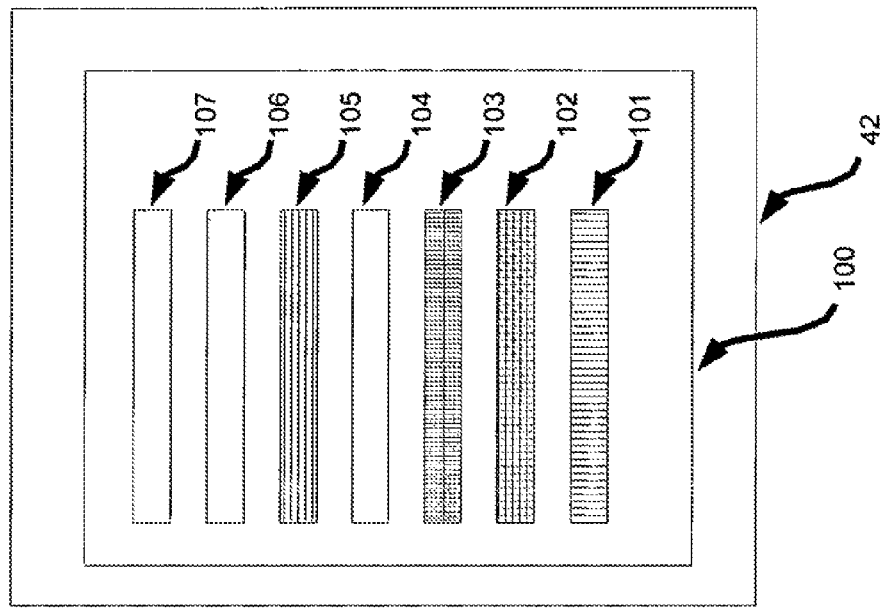
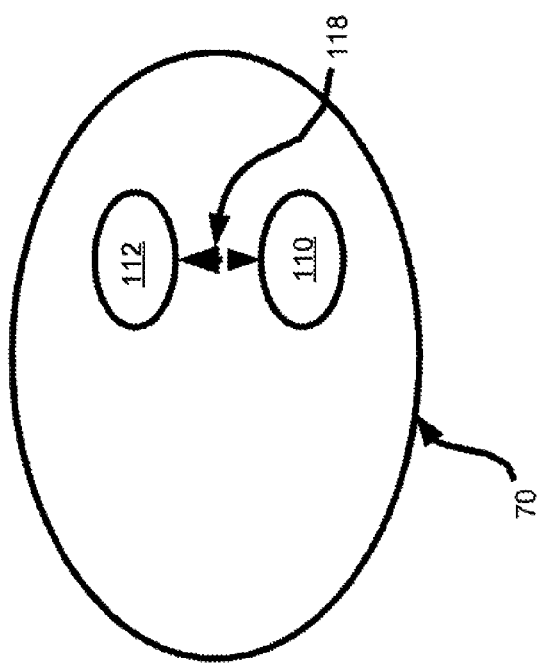
Fig. 6

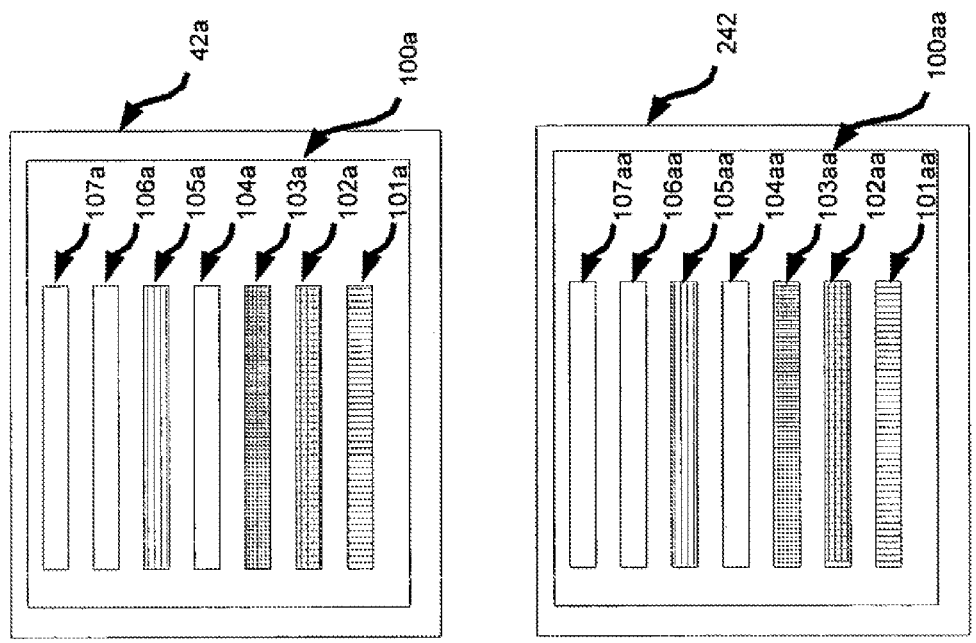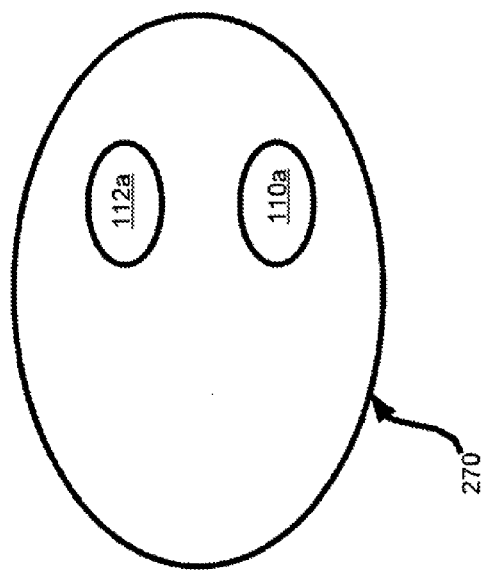
Fig. 9

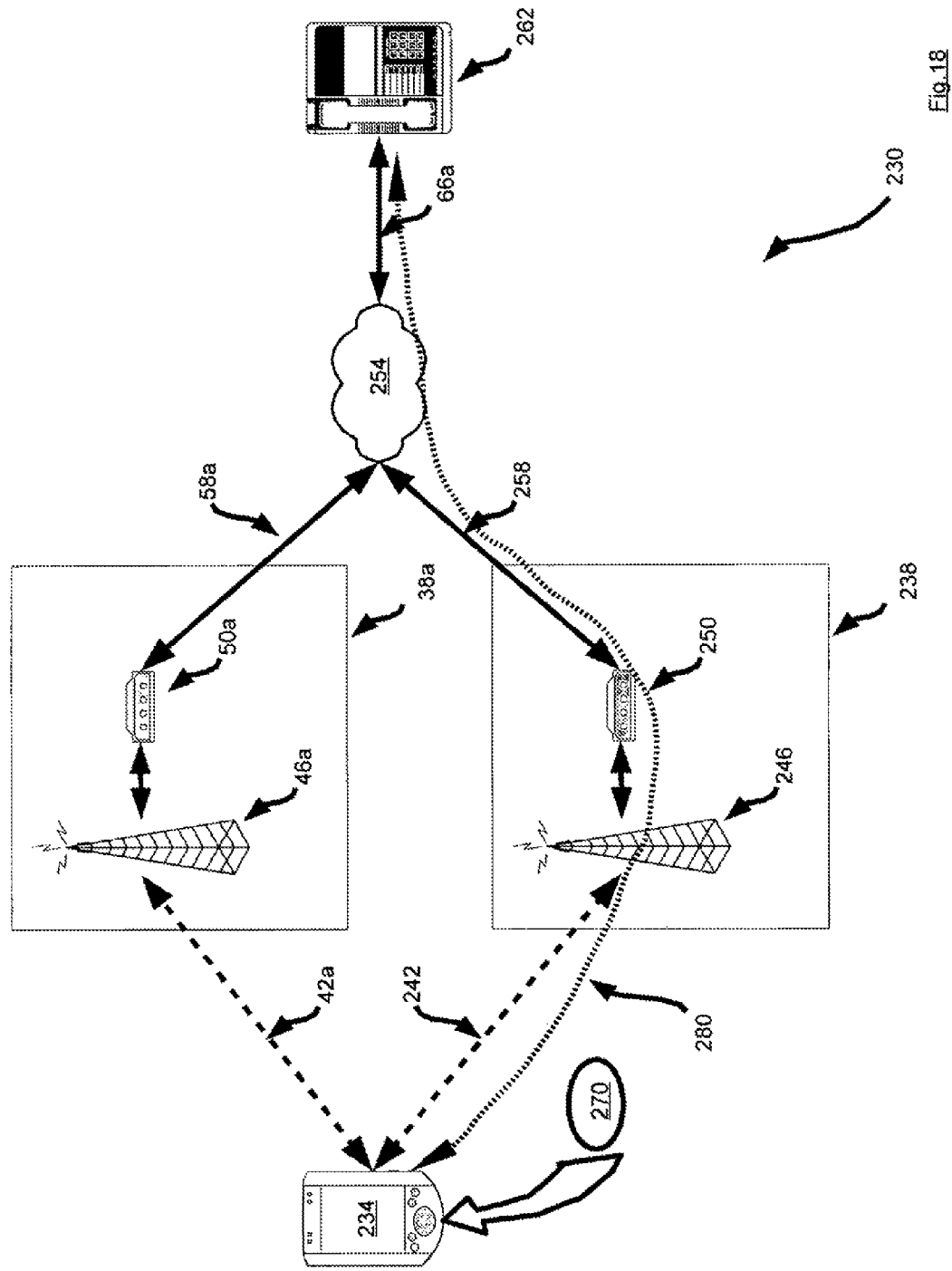

SYSTEM AND METHOD FOR DELIVERY OF PACKETS

CROSS-REFERENCE TO RELATED APPLICATION

This is a continuation of U.S. patent application Ser. No. 10/787,201 filed Feb. 27, 2004, (allowed), the contents of which are incorporated herein by reference.

FIELD OF THE INVENTION

The present application relates generally to computer networking and more particularly to a system and method for delivery of packets.

BACKGROUND OF THE INVENTION

Wireless communication technology now offers high quality voice and data services, with further enhancements on the horizon. As is well understood by those of skill in the art, wireless communications face several quality of service ("QOS") challenges that are not found in wired communications. More specifically, the quality of the wireless link can change according to environmental factors, movements of the wireless subscriber station, or movement of objects within the path between the subscriber station and the base station. Despite advances to wireless communications, however, certain QOS limitations are still common. For example, transport control protocol ("TCP") packets employ a time-based fail check strategy, wherein packets that are not acknowledged as received are continually resent according to a predefined time period, the spacing between each delivery attempt increasing gradually. After a certain number of retries, the connection is deemed to have failed. While this strategy can be effective in a wired link, it is not as suitable for packet delivery over wireless links that are experiencing connectivity problems.

SUMMARY OF THE INVENTION

It is an object to provide a novel connection system and method that obviates or mitigates at least one of the above-identified disadvantages of the prior art.

An aspect of the invention provides a method comprising the step of:

determining a quality of a link between an electronic device and a node by examining a first layer of a protocol stack used to implement the link that is different from a second layer of the protocol stack that is used to deliver the packets.

The method can further comprise the step of adjusting the delivery of the packets according to the determined quality.

The first layer can be layer four of the OSI model and the second layer can be layer two of the OSI model.

The method can further comprise the step of:

determining a quality of a second link between the electronic device and a second node by examining a third layer of a second protocol stack used to implement the second link that is different from fourth layer of the second protocol stack that is used to deliver the packets.

The method can further comprise the step of delivering the packets over the one of the two links based on a determination of which link has a more desirable quality.

Another aspect of the invention provides an electronic device that is operable to communicate with at least one node via a link. The device is operable to determine a quality of the link by examining a first layer of a protocol stack used to implement the link that is different from a second layer of the protocol stack that is used to deliver the Packets.

BRIEF DESCRIPTION OF THE DRAWINGS

The invention will now be described by way of example only, and with reference to certain embodiments and the accompanying drawings, in which:

FIG. 2 is a schematic representation that shows the packet delivery manager and the wireless link of FIG. 1 in greater detail;

FIG. 6 shows the manager and link of FIG. 2 interacting with each other as part of the performance of the method of FIG. 3;

FIG. 9 is a schematic representation that shows the packet delivery manager and the two wireless links of FIG. 8 in greater detail;

DETAILED DESCRIPTION OF THE INVENTION

Figure 1:
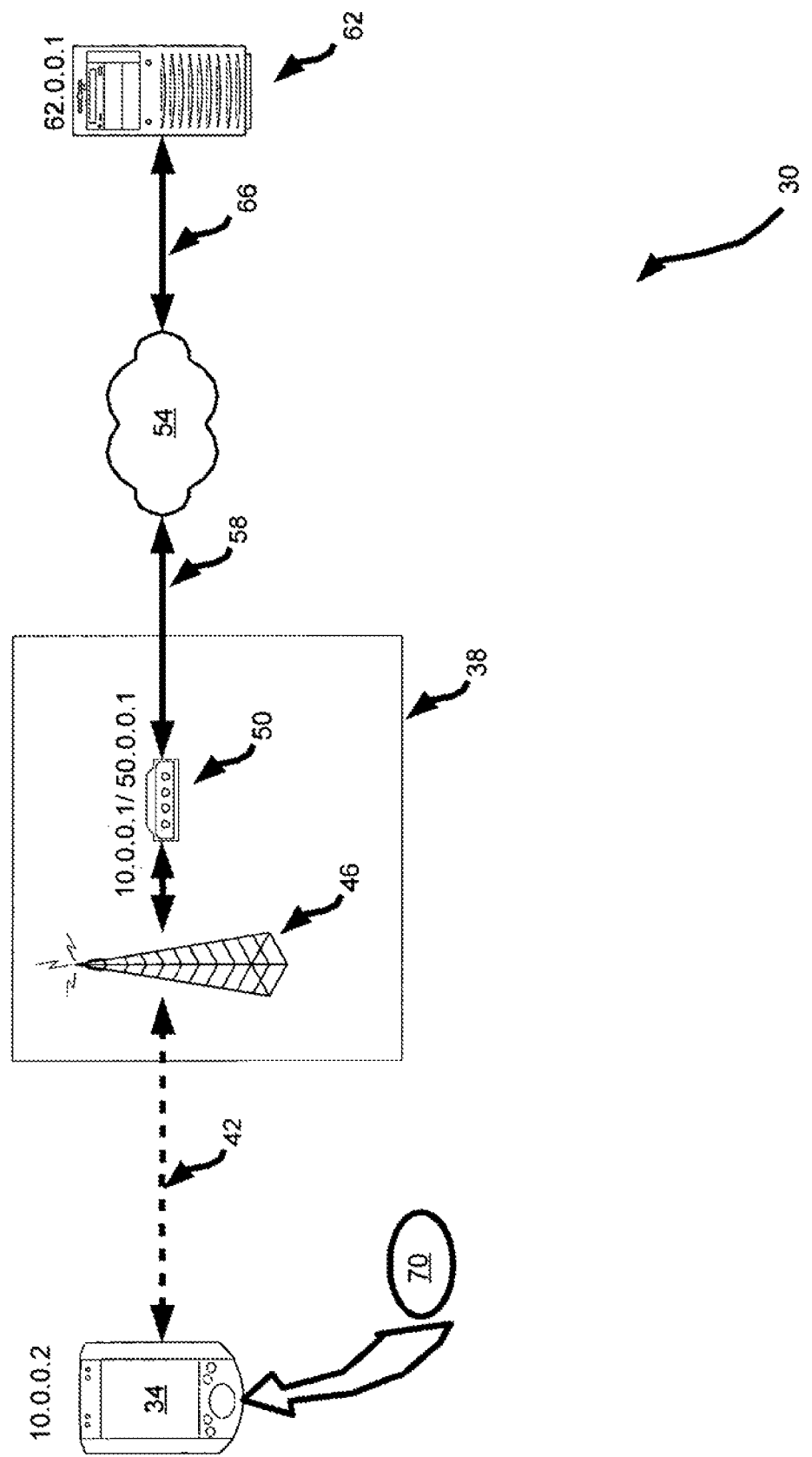
FIG. 1 is a schematic representation of a system for delivery of packets in accordance with an embodiment of the invention.

Referring now to FIG. 1, a system for delivery of packets is indicated generally at 30. In a present embodiment, system 30 includes at least one client 34 that connects to a service provider node 38 via a wireless link 42. Node 38 includes a wireless base station 46 that interacts with client 34 via link 42 and a NAT gateway 50. In turn, gateway 50 connects to the Internet 54 via a backhaul 58. Backhaul 58 can be a T1, T3 or any other suitable link for connecting node 38 to Internet 54. Internet 54, itself, connects to a web-server 62 via a second backhaul 66.

In a present embodiment, client 34 is a battery operated device that is based on the computing environment and functionality of a wireless personal digital assistant. It is, however, to be understood that client 34 need not be battery operated and/or can include the construction and functionality of other electronic devices, such as cell phones, smart telephones, desktop computers or laptops with wireless 802.11 or bluetooth capabilities or the like. In general, the use of the term "client" is not be construed in a limiting sense, but is used in the context of the example embodiment.

It is also to be understood that, in a present embodiment, at least a portion of the connection between client 34 and web-server 62 is bandwidth-constrained. In system 30, since link 42 is a wireless connection that may need to serve a plurality of clients 34, then link 42 is bandwidth constrained in relation to backhaul 58, backhaul 66 and the other elements that compose the connection between client 34 and web-server 62. Such bandwidth constraints can thus interfere with the speed and effectiveness with which a user operating clients 34 can access Internet 54 and web-server 62. Such constraints can furthermore cause client 34 to need to resend packets that are dropped over link 42 due to limitations of link 42.

NAT gateway 50 is based on standard NAT technology and thus allows a multiple number of clients 34 connected to node 38 to connect to Internet 54 though a public Internet Protocol ("IP") address assigned to NAT gateway 50. Accordingly, client 34 (and other clients connected to node 38) will typically have a private IP address, while NAT gateway 50 will have a public IP address accessible to any party on Internet 54. Thus, as client 34 accesses Internet 54, web-server 62 will communicate with client 34 via gateway 50, with gateway 50 "translating" IP addresses during such communication. In an example unique to the present embodiment, client 34 has the private IP address "10.0.0.2", gateway has the private IP address 10.0.0.1 and the public IP address of "50.0.0.1" and webserver has the public IP address "62.0.0.1".

Client 34 is configured determine the quality of link 42 in order to develop a retry strategy for transport control protocol ("TCP") packets and the like when delivery of such packets to server 62 fail, particularly when delivery fails due to problems with link 42. The means by which client 34 determines the quality of link 42 is not particularly limited, but in a present embodiment client 34 utilizes a known signal strength metric as is currently implemented on known wireless devices, and which is often represented graphically on the display of such a device as indicating a number-of-bars of coverage. Using this known signal strength measurement, client 34 is able to track what level of signal strength provides a good likelihood that transmission can occur. Client 34 is also able to track changes in that signal level, in that if a failure occurs at a particular signal level, and then the signal strength increases by a predefined amount, then client 34 may determine that the quality of link 42 has now improved to a level that transmission will be successful. Regardless of how the quality of link 42 is determined, client 34 also includes a packet delivery manager 70 executing thereon that is operable to perform this determination and to develop the retry strategy therefrom. Further understanding about client 34 and this retry strategy will provided below.

Referring now to FIG. 2, link 42 is shown in greater detail, and in particular a network protocol stack 100 employed by link 42. In a present embodiment, network protocol stack 100 is based on the Open Systems Interconnect ("OSI") reference model, and thus includes a physical layer 101, a data link layer 102, a network layer 103, a transport layer 104, a session layer 105, a presentation layer 106 and an application layer 107.

FIG. 2 also shows manager 70 in more detail, including two software objects 110 and 112. Object 110 is operable to determine the quality of link 42 and report that information to object 112. Object 112 is operable to employ a retry strategy for the delivery of packets (i.e. TCP packets and the like) over link 42 based on the quality of link 42 as determined by object 110.

Figure 3:
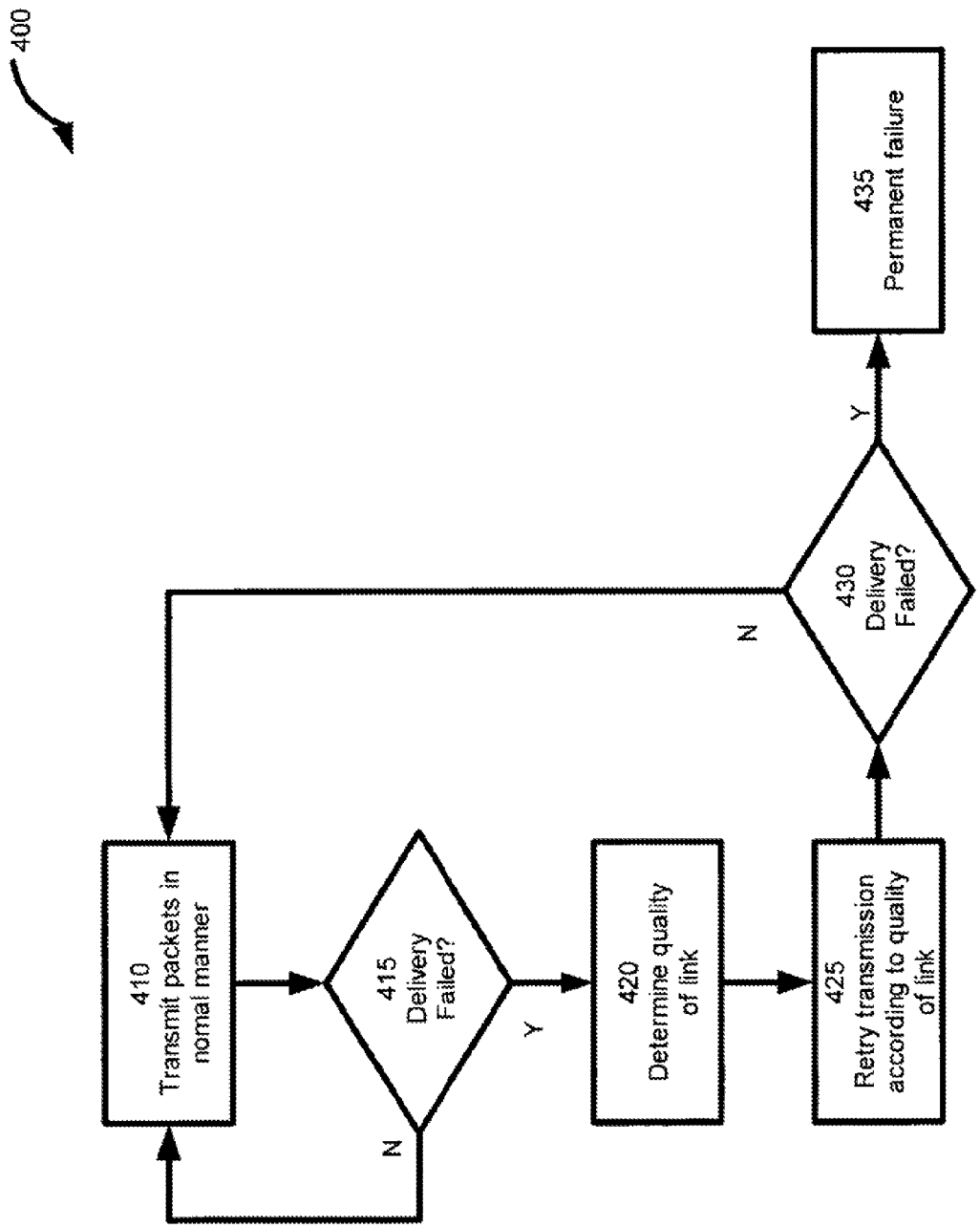
FIG. 3 is a flowchart depicting a method of delivering packets in accordance with another embodiment of the invention.

In order to help various aspects of system 30, reference will now be made to FIG. 3 which shows a method of packet delivery and which is indicated generally at 400. In order to assist in the explanation of the method, it will be assumed that method 400 is operated by client 34 using system 30. However, it is to be understood that client 34, system 30 and/or method 400 can be varied, and need not work exactly as discussed herein in conjunction with each other, and that such variations are within the scope of the teachings herein.

Before discussing method 400, it will be assumed that client 34 is engaged in communications with web-server 62, and that such communications involve the delivery of TCP packets from client 34 to web-server 62 via link 42. Beginning first at step 410, at least one packet is transmitted in a normal manner. Thus, where TCP packets are being sent, such packets are sent over link 42 by any known means and/or according to known wireless packet data transmission standards that are being employed by system 30, such as via the General Packet Radio Service ("GPRS") or the like. As is understood by those of skill in the art, such packets are sent over transport layer 104 pursuant to known standards.

Next, at step 415, it is determined whether the delivery of the packets at step 410 failed. If "no", then method 415 cycles back to step 410 and transmission continues as previously described. This determination is made using known means, such as via client 34 failing to receiving a "not acknowledge" signal from server 62, or server 62 failing to respond to an information request sent within that TCP packet. Thus, if delivery did fail, then method 400 advances to step 420.

Figure 4:
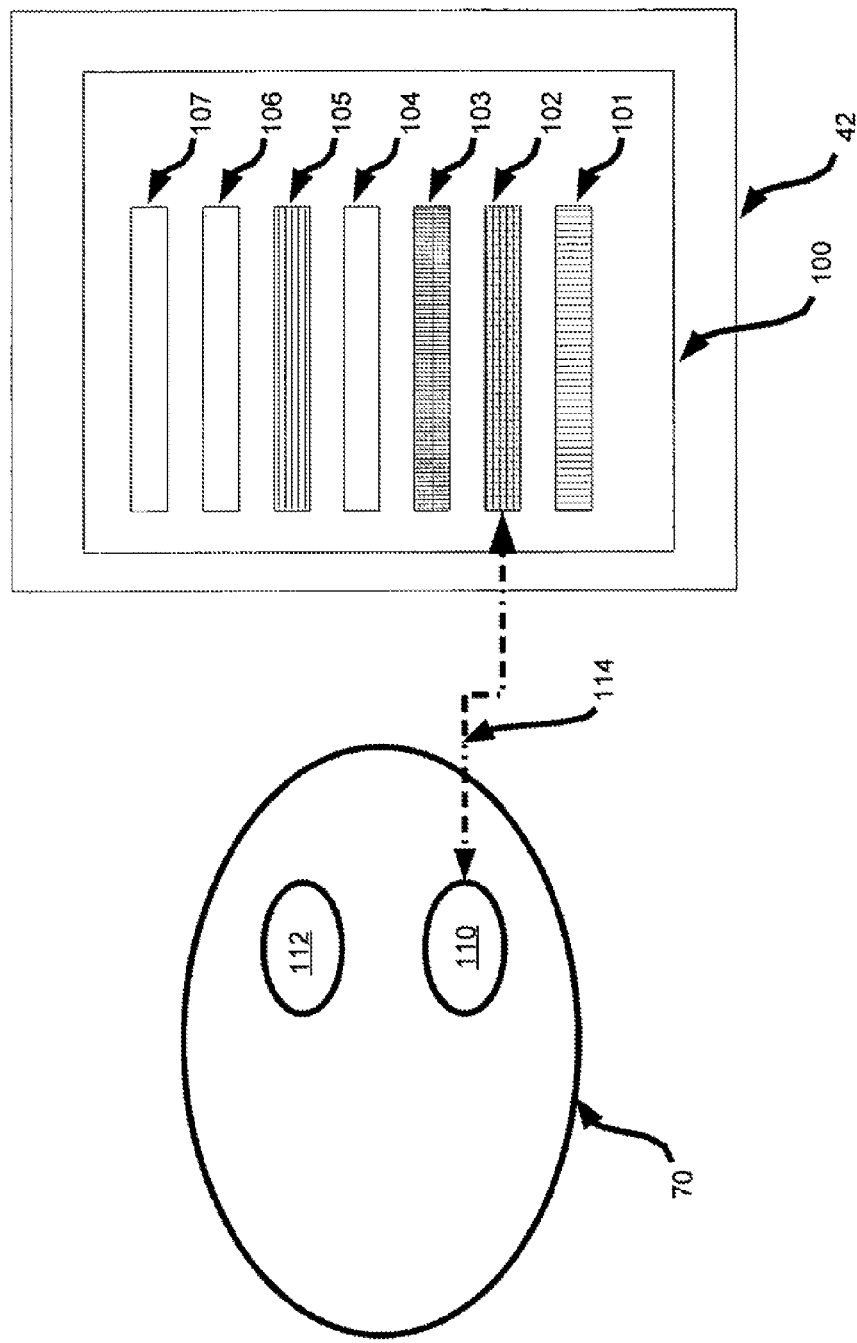
FIG. 4 shows the manager and link of FIG. 2 interacting with each other as part of the performance of the method of FIG. 3.

At step 420, the quality of the link is determined. In the present example, the quality of link 42 is determined. This step is represented graphically in FIG. 4, as object 110 queries (indicated at reference character 114) information that is inherently available about the quality of link 42 from data link layer 102 of protocol stack 100 that is employed to implement link 42. In particular, layer 402 is queried by object 110 for known information about the quality of link 42, including such information as signal strength and reachability of base station 46.

Figure 5:
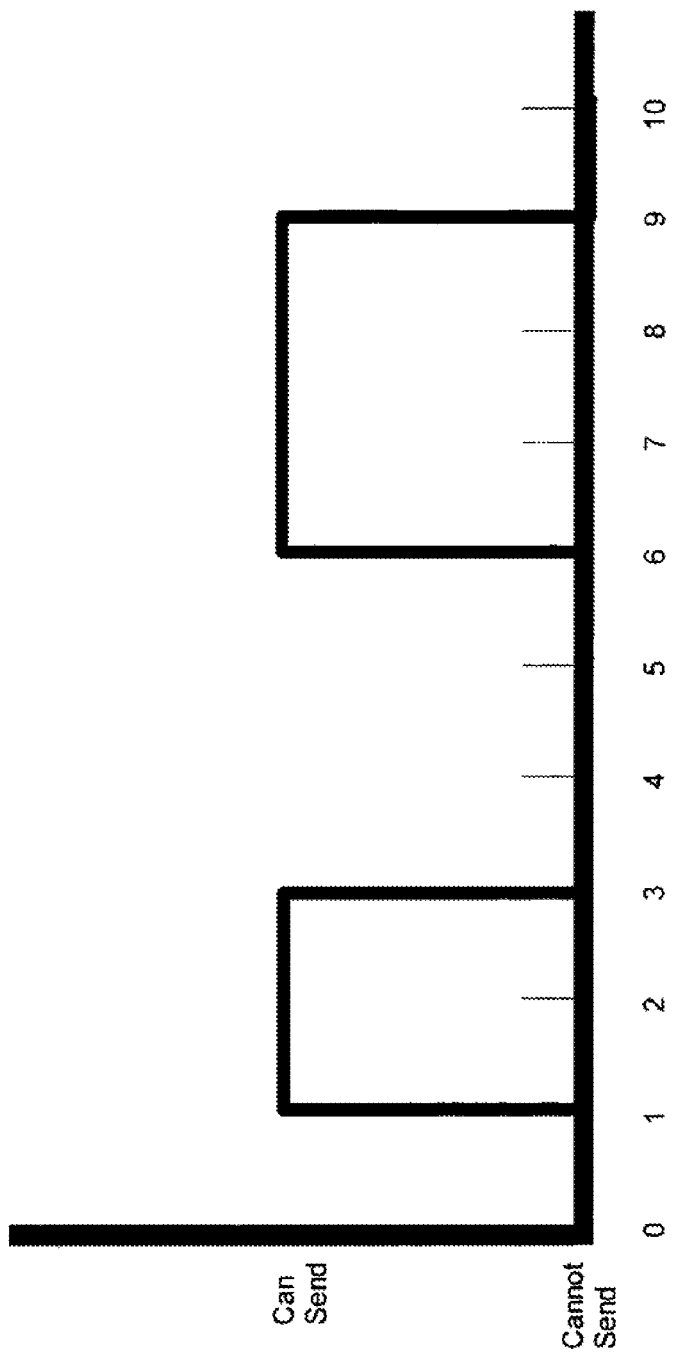
FIG. 5 shows an example of the results returned from the determination of link quality performed during the method of FIG. 2.

FIG. 5 shows an example of the results that can be determined, (or at least estimated) as a result of performing step 420. FIG. 5 thus shows a graph that represents the ability of client 42 to successfully send data to base station 46 over the previous ten second period. In this example, it is shown that over the previous ten second period, client 42 was successfully able to send data between the first and third seconds of the ten second period, and between the sixth and ninth second of the ten second period. During the remaining times, client 42 was unable to send data to base station 46. Those of skill in the art should appreciate that the results shown in FIG. 5 are a simplified example for the purposes of assisting in explaining the present embodiment. In practice the results from performing step 420 would not likely include such sharp transitions and would instead show a greater variability in signal strength over time. By the same token, the results generated by step 420 can, in certain implementations, be considered an estimation of link quality, rather than an precise determination.

Figure 7:
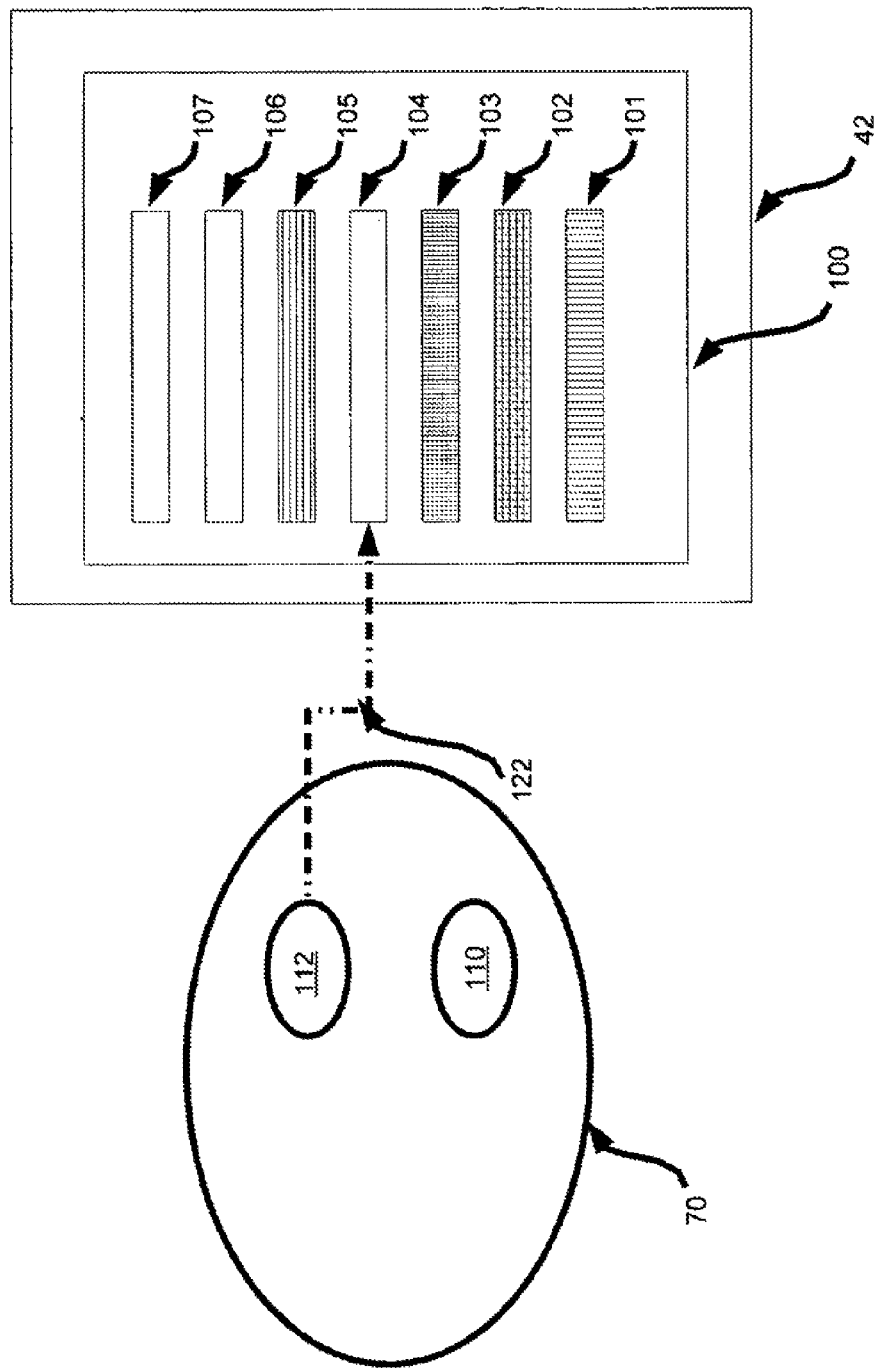
FIG. 7 shows the manager and link of FIG. 2 interacting with each other as part of the performance of the method of FIG. 3.

Method 400 then advances from step 420 to step 425, at which point transmission of the failed packets is retried in accordance with the information developed at step 420. This is represented in FIG. 6 and FIG. 7. In FIG. 6, object 110 is shown reporting the results of its determination from step 420 to object 112, via the pathway represented by the double-headed arrow indicated at 118. In FIG. 7, object 112 is shown as retrying to transmit the failed packets via layer 104 according to now known quality of link 42. The retrying of the transmission is represented by the double-headed arrow indicated at 122. The retrying employed at step 425 can be based on any criteria that makes use of the information gathered at step 420 in order to develop a retry strategy. In the simplest case, the retrying would be based on the assumption that each ten second period has the same "can send" and "cannot send" characteristics. Thus, based on this criteria, at step 425 the retrying of transmission would be performed only between the first and third seconds of the subsequent and/or between the sixth and ninth second of the subsequent ten second period. It is to again be reemphasized that any criteria that employs, at least in part, information gathered during method 400 can be employed.

Method 400 then advances to step 430, at which point a further determination is made as to whether delivery of the packets failed. Step 430 is performed in much the same way as step 415. If the delivery completely fails, then the method advances to step 435 and the delivery is deemed to be a permanent failure. However, if the delivery was successful, then method 400 would advance from step 430 back to step 410 where method 400 would begin anew.

It should be understood that a number of variations to step 400 are possible. For example, step 410 and 415 can be eliminated an all packets that are sent by client 34 can be sent based on a determination of the quality of link 42. By the same token, the determination of the failure at step 430 can be performed after a number of retries of steps 420 and 425, before deeming the entire delivery a permanent failure.

Figure 8:
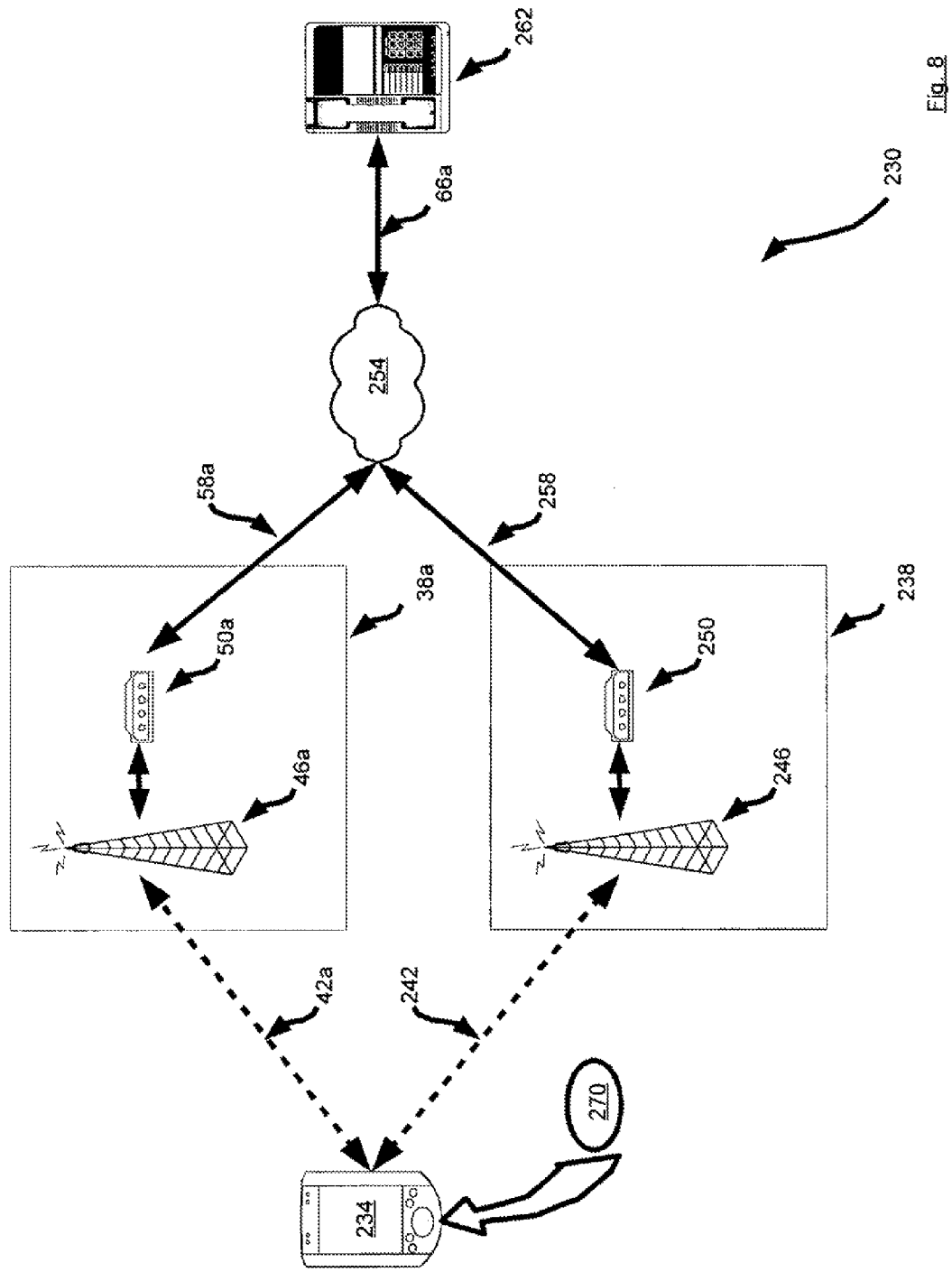
FIG. 8 shows a system for delivery of packets in accordance with another embodiment of the invention.

Referring now to FIG. 8, a system for delivering packets in accordance with another embodiment of the invention is indicated generally at 230. System 230 contains many similar components to those found in system 30. In particular, components in system 230 that bear the same reference character as a similar component in system 30, but followed by the suffix "a", are substantially the same as their equivalent component in system 30, allowing for necessary modifications for the overall functionality of system 230 and subject to additional comments about those components. However, components in system 230 that bear the same reference character as a'similar component in system 30, but preceded with the prefix "2", are somewhat different and thus greater discussion of those components is provided as needed.

More specifically, system 230 includes a client 234 that is substantially the same as client 30, except that client 234 includes voice functionality and is therefore able to carry voice calls. System 230 also includes a voice over interne protocol ("VoIP") telephony handset 262 that is operable to conduct voice calls. System 230 also includes a VOIP network 254, which is essentially a combination of the Internet with a voice switch. The Internet portion of VOIP network 254 carries the VOIP calls, while the voice switch portion of converts those VOIP calls into a voice signal that can be utilized by handset 262. Thus, handset 262 is operable to conduct voice calls over network 254 via backhaul 66a.

Accordingly, node 38a and its components (base station 46a and gateway 50a) are operable to carry voice calls in a packetized format between client 234 and handset 262. In the present embodiment, node 38a is based on a cellular telephone system such as the Global System for Mobile Communications ("GSM"), or Code Division Multiple Access ("CDMA") or Time Division Multiple Access ("TDMA"), or Frequency Division Multiple Access ("FDMA") or the like. More specifically, the portion of any voice call between client 234 and handset 262 that is carried over link 42a is carried over a conventional voice channel as commonly employed in existing GSM, CDMA, TDMA, FDMA, etc. networks.

By the same token, system 230 also includes a second node 238, that includes its own base station 246 and gateway 250. Gateway 250, in turn, is operable to connect with network 254 via a backhaul 258. However, in contrast to node 38a, second node 238 is based on a short range wireless protocol, such as 802.11 or bluetooth. More specifically, the portion of any voice call between client 234 and handset 262 that is carried over link 242 is carried as a VOIP packets over an IP data channel that is commonly employed in existing short range networks such as 802.11 or bluetooth.

Thus, in addition to being able to conduct voice telephone calls, client 234 is also includes appropriate hardware, software and network interfaces to allow client 234 to communicate over links 42a and 242. Further, client 234 is operable determine the quality of link 42a and link 242 in order to determine which link 42a or 242 is most suitable (or otherwise desirable) for carrying a voice call from client 234 to handset 262. Client 234 includes a link manager 270 executing thereon that is operable to perform the above-mentioned determination and to utilize the most suitable link 42a or 242 based on that determination. Further discussion about client 234 and this link utilization will provided below.

Referring now to FIG. 9, links 42a and 242 are shown in greater detail, and in particular the network protocol stack 100a employed by link 42a and the network protocol stack 100aa employed by link 242. In a present embodiment, network protocol stacks 100a and 100a are also based on the Open Systems Interconnect ("OSI") reference model, and thus each include the same layers as stack 100. Accordingly, stack 100a and stack 100a and thus each include a physical layer 101a and 100aa, a data link layer 102a and 102aa, a network layer 103a and 103aa, a transport layer 104a and 104aa, a session layer 105a and 105aa, a presentation layer 106a and 106aa and an application layer 107a and 107aa respectively.

FIG. 9 also shows manager 270 in more detail, including two software objects 110a and 112a. Object 110a is operable to determine the quality of links 42a and 242a and report that information to object 112a. Object 112a is operable to utilize an appropriate (or otherwise desired) one of links 42a and 242a for the delivery of packets (i.e. TCP packets and the like) based on the quality of those link 42a and 242a as determined by object 110a.

Figure 10:
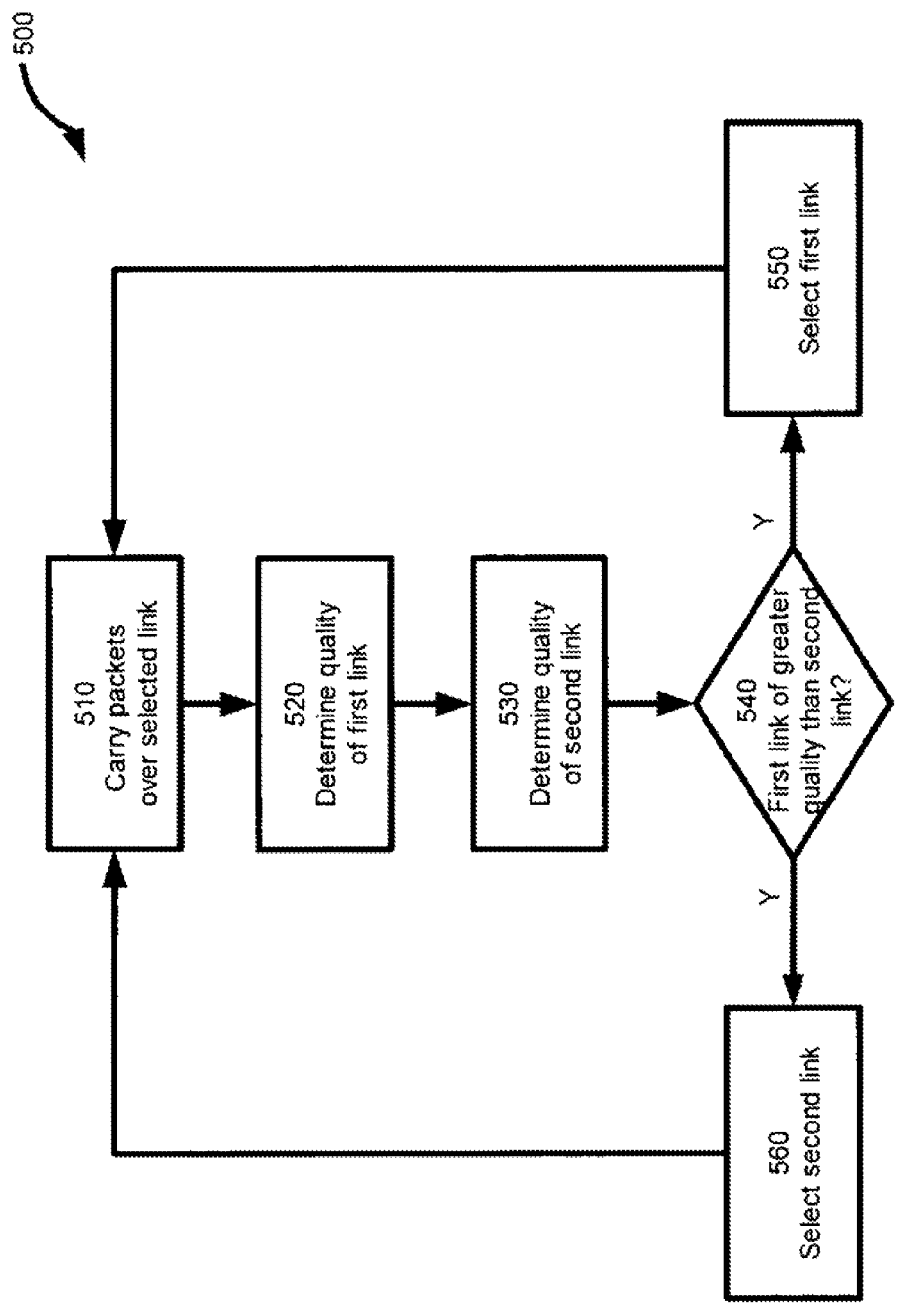
FIG. 10 is a flowchart depicting a method of delivering packets in accordance with another embodiment of the invention.

In order to help explain various aspects of system 30a, reference will now be made to FIG. 10 which shows a method of packet delivery and which is indicated generally at 500. In order to assist in the explanation of the method, it will be assumed that method 500 is operated by client 234 using system 30a. However, it is to be understood that client 234, system 30a and/or method 500 can be varied, and need not work exactly as discussed herein in conjunction with each other, and that such variations are within the scope of the teachings herein.

Figure 11:
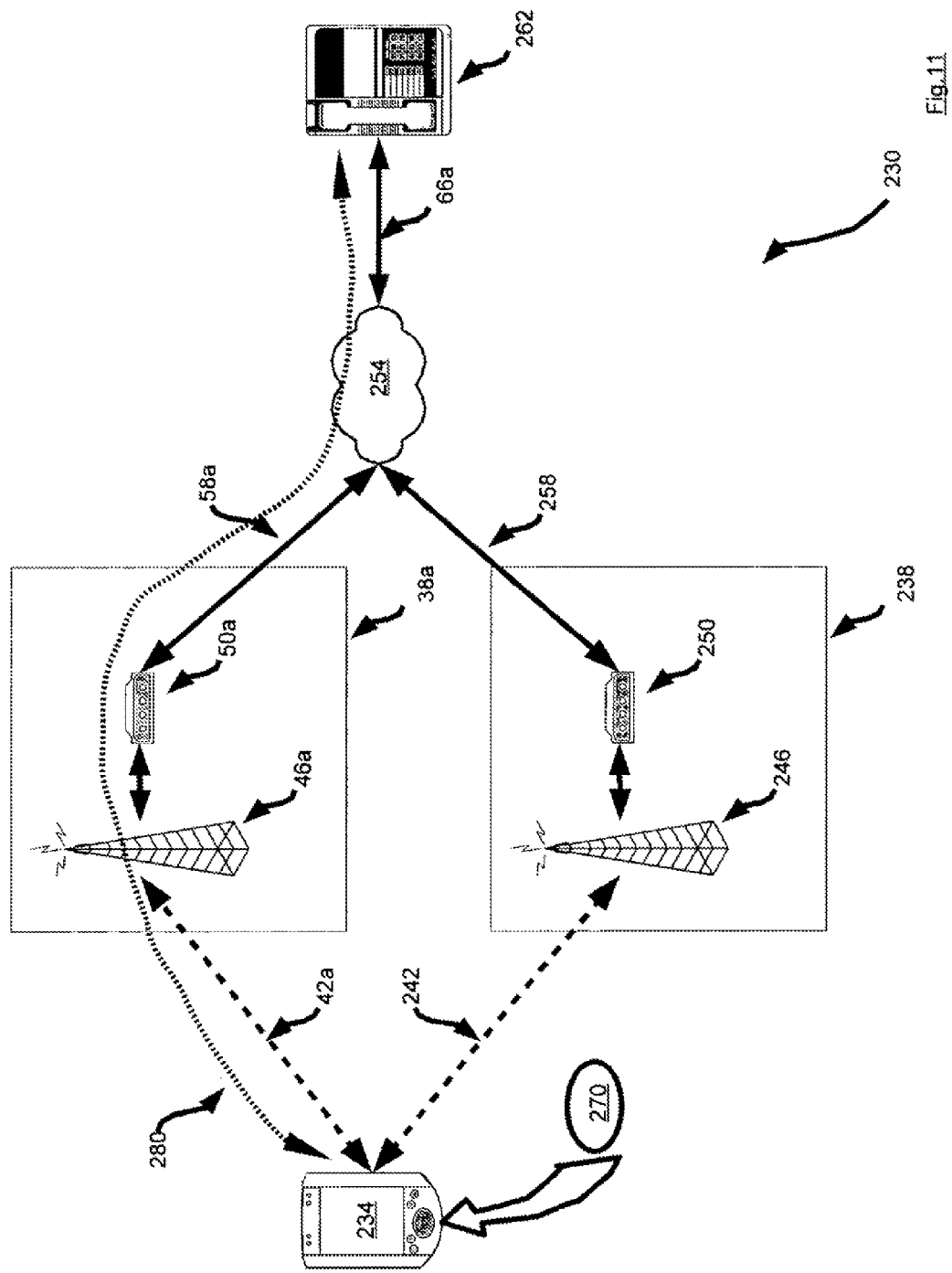
FIG. 11 shows an example of a communication pathway within the system of FIG. 9 prior to performing the method of FIG. 10.

Before discussing method 500, it will be assumed that link 42 has been selected in order to carry a VoIP phone call between client 234 and handset 262, and thus such communications at this initial state involve carrying voice packets between client 234 to handset 262 via link 42. This initial state is represented in FIG. 11, and this initial pathway of carrying voice packets is indicated at 280. This initial state is also represented in FIG. 12, as object 112*a* is shown carrying voice packets over layer 104*a* of link 42*a*, along voice packet pathway 280.

Figure 12:
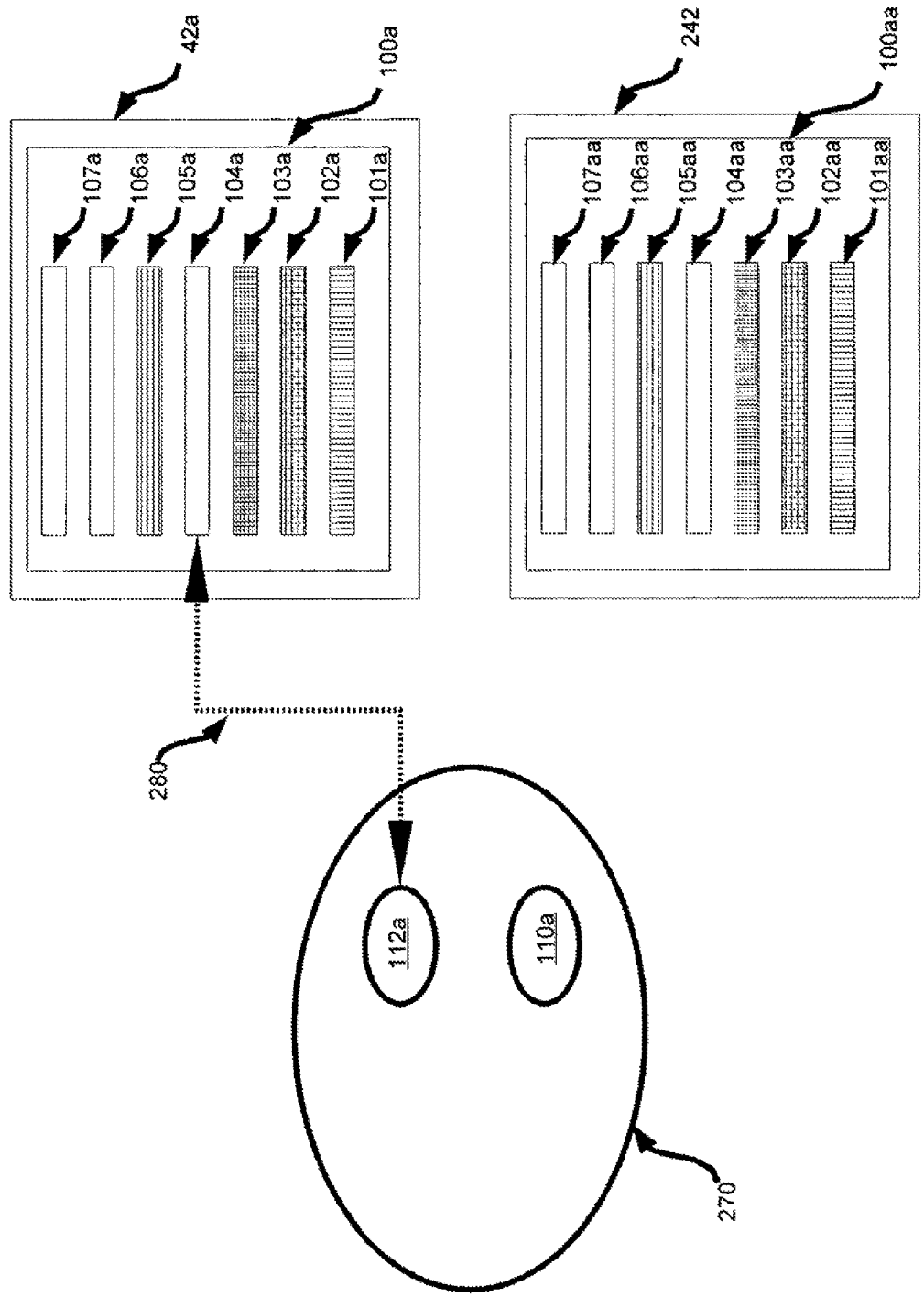
FIG. 12 shows the manager and link of FIG. 9 interacting with each other as part of the performance of the method of FIG. 10.
Figure 13:
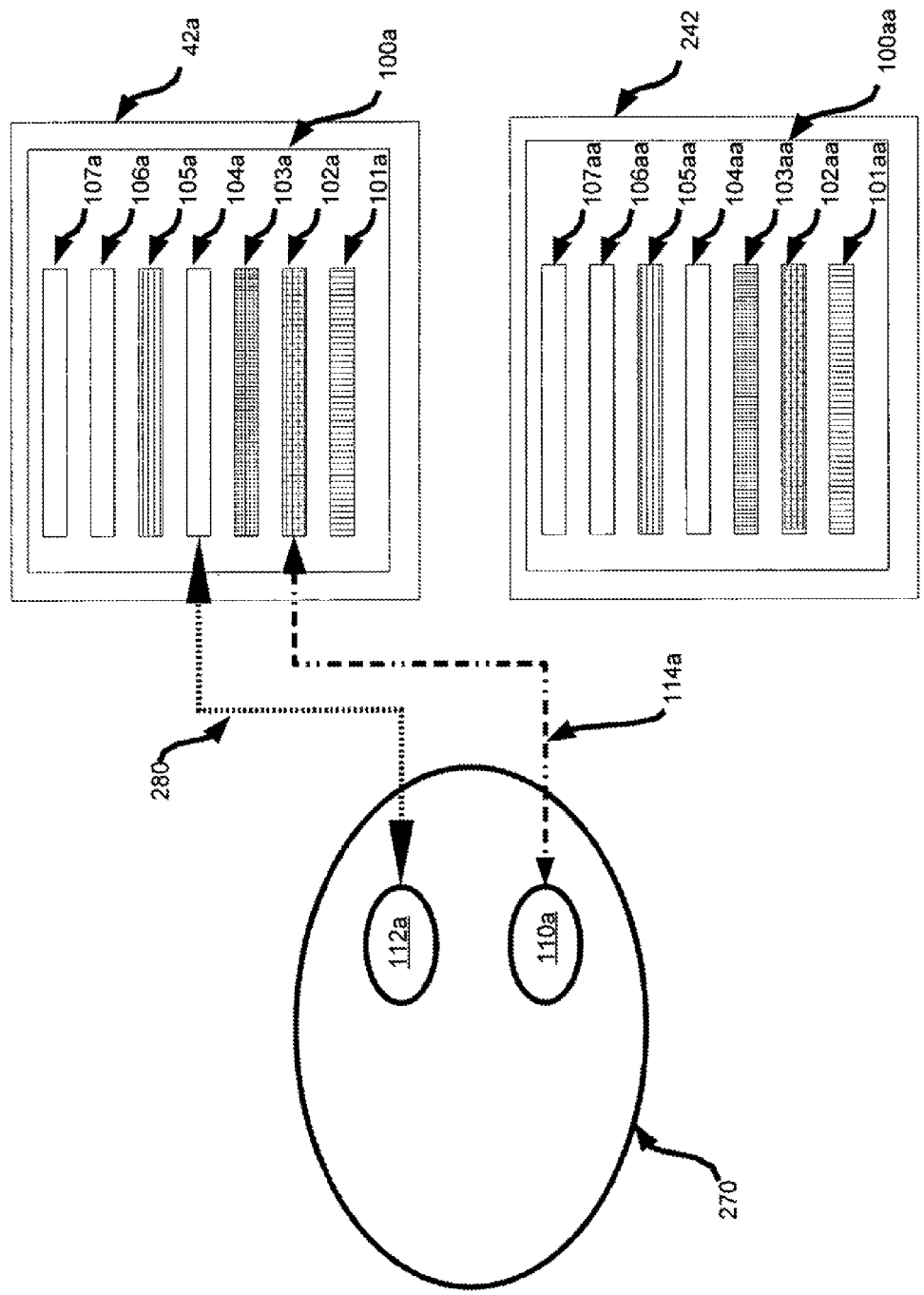
FIG. 13 shows the manager and link of FIG. 9 interacting with each other as part of the performance of the method of FIG. 10.
Figure 14:
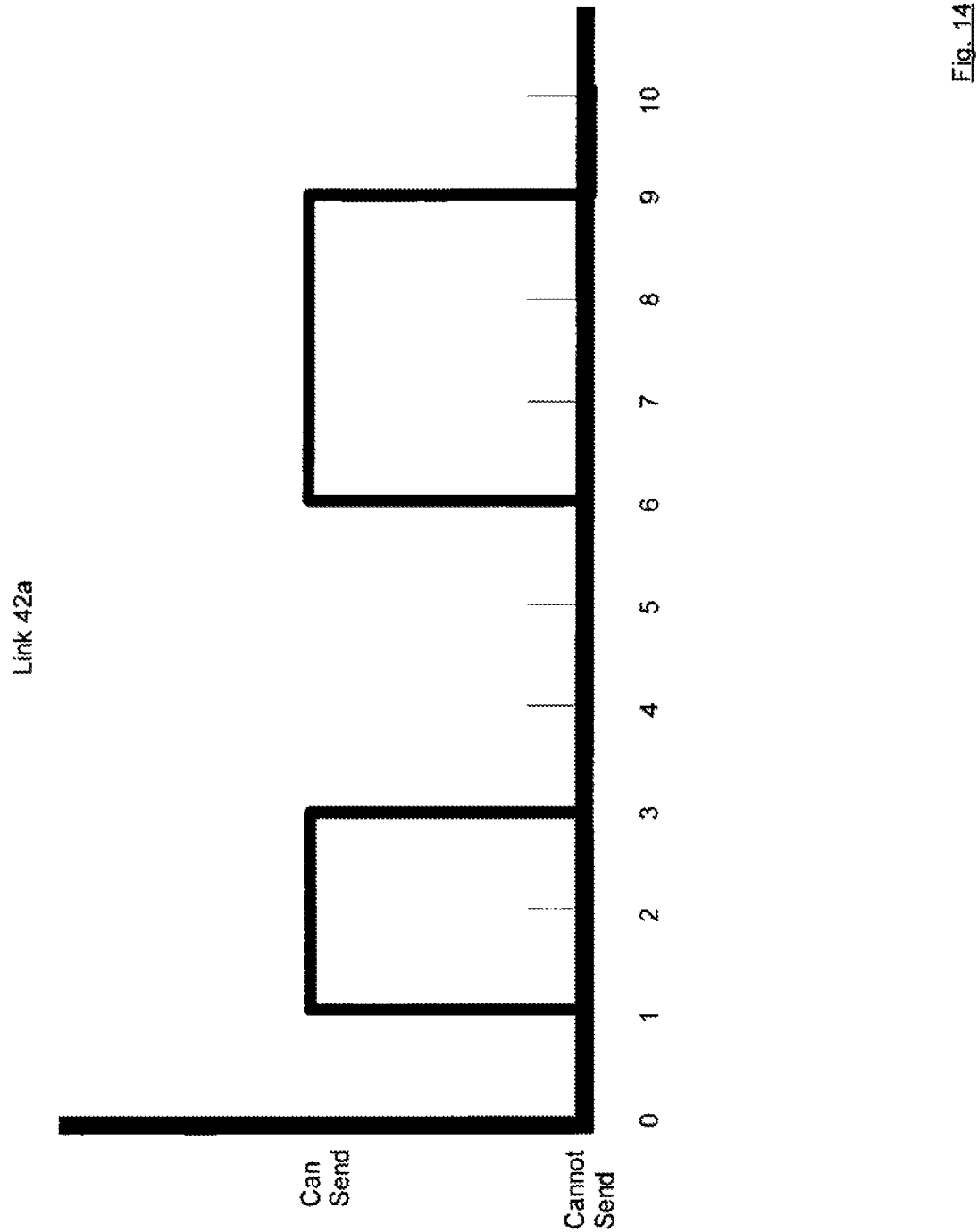
FIG. 14 shows an example of the results returned from the determination of the quality of the first link performed during the method of FIG. 10.

Beginning first at step 510, packets are carried along pathway 280 as shown in FIGS. 11 and 12. Next at step 520, the quality of a first link is determined. This is represented in FIG. 13, as object 110*a* is shown querying layer 102*a* of link 42*a*, much in the same manner as previously described in relation to step 420 of method 400. This query is represented along pathway 114*a* in FIG. 13. FIG. 14 represents an example of the results of the query performed at step 520. In the example in FIG. 15, it is shown that over the previous ten second period, client 234 link 42*a* was available for sending data between the first and third seconds of the ten second period, and between the sixth and ninth second of the ten second period. During the remaining times, client 234 was unable to send data to base station 46*a* over link 42*a*.

Figure 15:
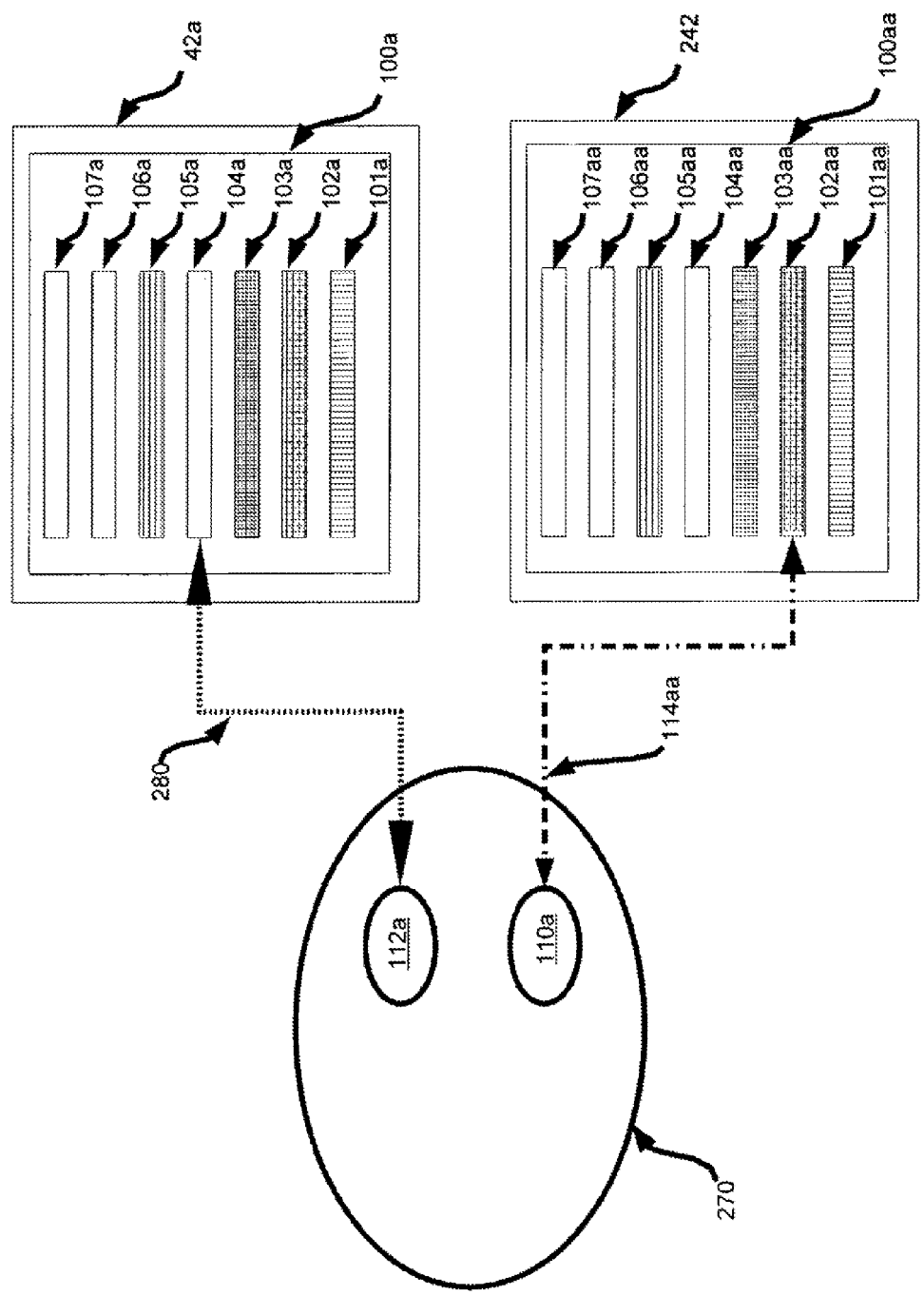
FIG. 15 shows the manager and link of FIG. 9 interacting with each other as part of the performance of the method of FIG. 10.
Figure 16:
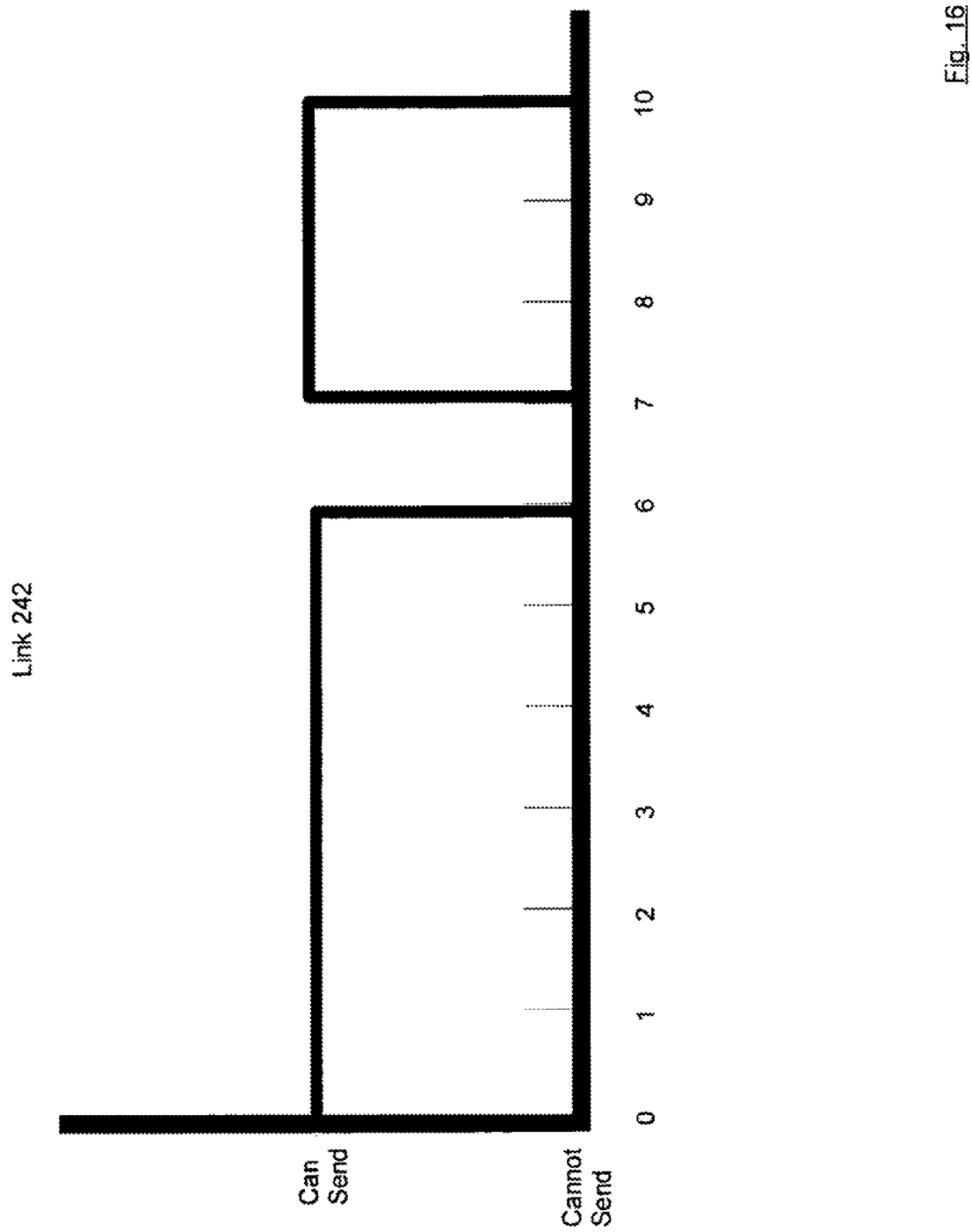
FIG. 16 shows an example of the results returned from the determination of the quality of the second link performed during the method of FIG. 10.

Next at step 530, the quality of a second link is determined. This is represented in FIG. 15, as object 110*a* is shown querying layer 102*aa* of link 242*a*, much in the same manner as previously described in relation to step 420 of method 400. This query is represented along pathway 114*aa* in FIG. 15. FIG. 16 represents an example of the results of the query performed at step 520. In the example in FIG. 16, it is shown that over the previous ten second period, client 234 link 42*a* was available for sending data between zero and six seconds of the ten second period, and between the seven and ten seconds of the ten second period. During the remaining times, client 234 was unable to send data to base station 246 over link 242.

Next, at step 540, a determination is made as to which of the links is of better quality. If the first link is of higher quality than the second link then the method advances to step 550, and the first link is selected for ongoing carrying of packets over that first link. If, however, the second link is of higher quality than the first link then the method advances to step 560 and the second link is selected for the ongoing carrying of packets over that second link. Method 500 returns to step 510 from both steps 550 and 560, at which point the method begins anew with traffic being carried over the selected link.

In the present example, a comparison of the quality of link 42*a* in relation to the quality of link 242 can be made by comparing FIGS. 14 and 16. It can be seen that link 242, in this example, is of higher quality than link 42*a* (i.e. because link 242 was available for a greater period of time over the previous ten second period than link 42*a*), and therefore at step 540 it would be determined that the second link was healthier than the first link and so method 500 would advance from step 540 to step 560.

Figure 17:
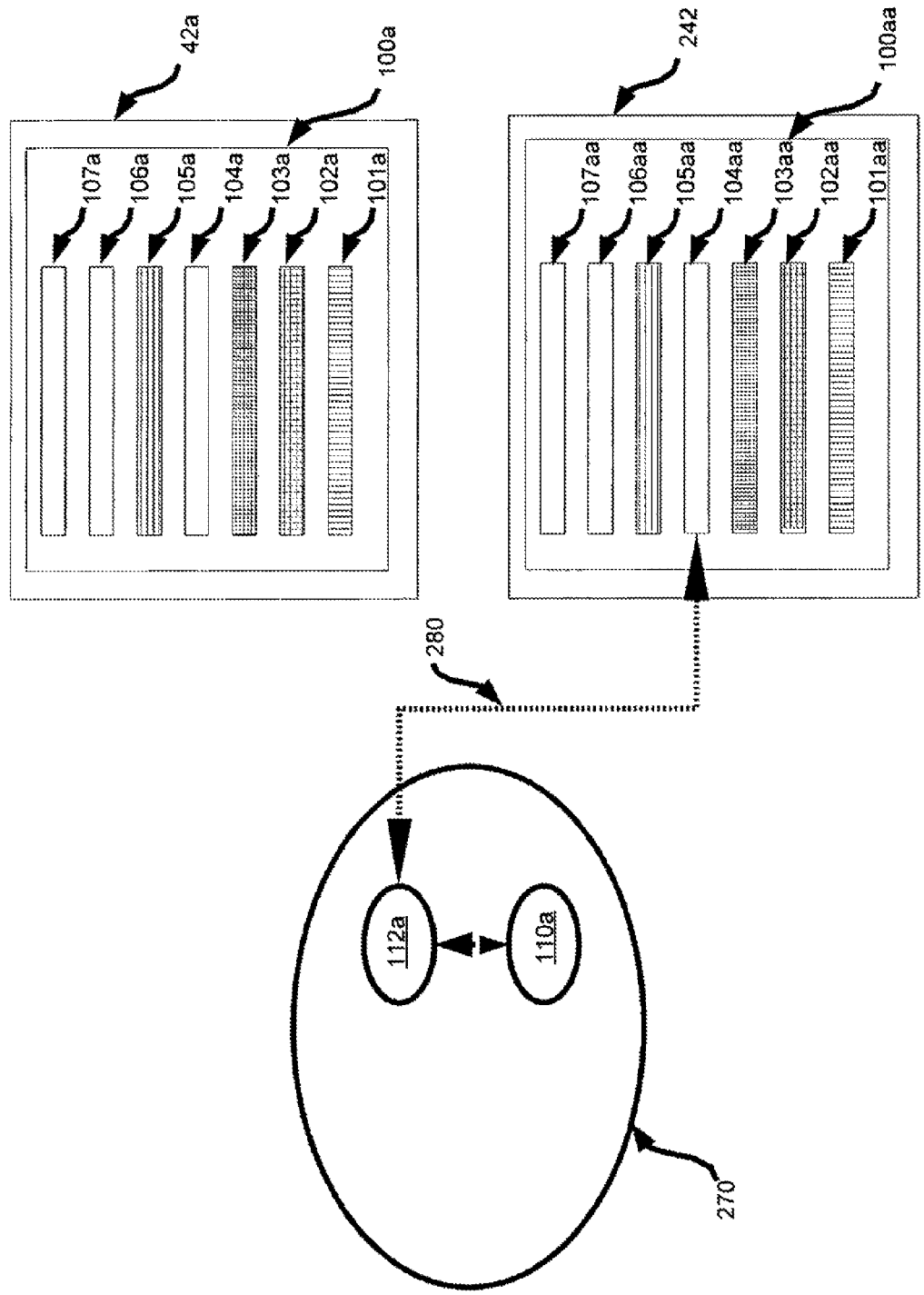
FIG. 17 shows the manager and link of FIG. 9 interacting with each other as part of the performance of the method of FIG. 10; and, FIG. 18 shows an example of a communication pathway within the system of FIG. 9 after performing the method of FIG. 10.

At step 560, the second link is selected. Steps 540 and 560 for this example are represented in FIG. 17, wherein object 110*a* is shown communicating the results of the determinations made at steps 520 and 530, so that object 112*a* at step 540 can determine that the second link (i.e. link 242) is of greater quality than the first link (i.e. link 42*a*). FIG. 17 additionally shows that voice packet pathway 280 is now being carried over layer 104*aa* of link 242 by object 112*a*, instead of over layer 104*a*. FIG. 18 also reflects this change, as pathway 280 now travels via node 238.

It is to be understood that the actual mechanics of causing pathway 280 to switch from node 38*a* to node 238 will involve a number of substeps, and such substeps can be effected by any desired means. For example, assume that node 38*a* and node 238 are both Dynamic Host Configuration Protocol ("DHCP") devices, in that they each assign an IP address to device 234, then as part of the transition from the first link to the second link, then device 234 will initially inform handset 262 that the IP address being used to communicate with device 234 is about to change from the IP address for client 234 that is assigned by node 38*a* to the IP address for client 234 that is assigned by node 238.

It is to be reemphasized that the specific determination/estimation of quality described above in relation to steps 520-540 and FIGS. 14 and 16 is merely a simplified example for the purposes of assisting in the explanation. Of particular note, prior ten second quality sample is too short to provide a meaningful comparison, but serves to provide a simplified concept. In practice, those of skill in the art may implement any variety of desired or suitable criteria can be used to compare the two links and ultimately select one of those links in order to carry packets. Other criteria could also include bit rates, or even the relative cost to the subscriber owning client 234 to accessing a given link. Another specific criteria could include reachability, where additional equipment (not shown in system 30), such as firewalls, or call gateways, that may or may not permit the operation of the service over one of the links. Thus the pathway that has the best, or otherwise desired reachability would be given priority. Thus, where the quality of both links 42*a* and 242 is substantially equal, then the ultimate decision of which link to choose may be based, at least in part, on the financial cost with using each link 42*a* or 242. In particular, in the short term it is at least considered that the cost of carrying a voice call over an 802.11 wireless LAN would be cheaper (or even free) in relation to the cost of carrying a voice call over a conventional cellular telephone network.

While only specific combinations of the various features and components have been discussed herein, it will be apparent to those of skill in the art that desired subsets of the disclosed features and components and/or alternative combinations of these features and components can be utilized, as desired. For example, it should also be understood that while system 30*a* relates to a VOIP telephone call at handset 262, it should be understood that system 30*a* can be modified to work with a traditional public switched telephone network ("PSTN") type of telephone call, through the use of appropriate PSTN gateways. System 30 can also be likewise so modified.

Furthermore, it should be understood that methods 400 and 500 can be combined, in that the performance of step 510 can include the performance of method 400, so that packets are transmitted by client 234 in accordance with a determined quality of the link being used to carry packets at step 510.

Furthermore, system 30*a* can also be modified to work with other types of services other than voice, and can relate to any type of service that can be carried over link 42*a* and link 242 on behalf of client 234. Other types of services can include, for example, web-browsing, email, paging, voice-messaging, etc.

Furthermore, system 30 can include additional nodes, in addition to nodes 38*a* and 238, provided that client 234 includes appropriate interfaces to communicate with those additional nodes. In this manner, method 500 can be modified to help select the link of the best or otherwise most desirable quality for client 234 from a plurality of available links.

Furthermore, while the embodiments discussed herein relate to wireless links 42, 42a and 242, the teachings herein can be applied to wired links as, well. For example, link 42a may be a wired link, while a wired version link 242, i.e. an Ethernet cable, may become active while link 42a is in use. In this example, method 500 may select to transition the carrying of packets from the wireless link 42a to the now available Ethernet cable.

As an additional example, link 242 and 42a can be both based on the same technology (e.g. both links based on 802.11 or, both links based on GPRS), but where those links 242 and 42a each lie in different administrative domains. Since the teachings herein include an evaluation of layers outside of the layer 102, determinations can be made as to the configurations of those layers, and therefore allow for assessments of reachability of different services. For example, in the 802.11 environment, a cafe in an airport having an 802.11 hotspot may only allow browsing (via TCP Port 80, while a different 802.11 hotspot offered by the actual airport may allow all traffic including voice. Thus both links can be evaluated using the teachings herein to determine the best or otherwise most desirable link for carrying a VOIP call.

Embodiments herein provide various advantages over the prior art. For example, prior art link selection is typically performed within one particular technology (e.g. a handoff within a GPRS or CDMA network), but certain embodiments herein include selection of links between the same or different technologies (e.g. between GPRS and 802.11). Another example of an advantage is that the selection process of that link can be done serially, evaluating one link and then the next, to determine which link is most appropriate (or otherwise desirable or even possible) for a particular service (e.g. is it even possible to VOIP over that link.) However, when such determination is performed simultaneously, it is possible to use the teachings herein to maintain services that require low latency (like voice) which would not otherwise be possible without this coordinated evaluation. This is specifically advantageous over a known limitation in the independent nature of 802.11 nodes, which normally do not define a hand off of sufficiently low latency to maintain a voice call if you did not evaluate the two links simultaneously. Other advantages will be apparent those of skill in the art.

The above-described embodiments of the invention are intended to be examples and alterations and modifications may be effected thereto, by those of skill in the art, without departing from the scope of the invention which is defined solely by the claims appended hereto.

The invention claimed is:

1. A method of delivering packets over a link comprising the steps of:
   transmitting at least one packet over said link via a first layer of a protocol stack employed by said link;
   determining, prior to transmitting further packets, whether transmission of said at least one packet failed;
   repeating said transmitting and determining steps until said transmitting step is determined to have failed;
   determining, responsive to said transmitting step failing, a quality of said link at an electronic device by examining signal strength information available within a second layer of said protocol stack; said second layer being a lower layer in said protocol stack than said first layer;
   developing a retry strategy for said transmitting step based on said determined quality; and,
   retransmitting said at least one packet via said first layer according to said retry strategy.

2. The method of claim 1 comprising the steps of:
   resuming said method at said transmitting step using said retry strategy if said re-transmitting step succeeds; and, terminating said method if said re-transmitting step fails.

3. The method of claim 1 wherein said first layer is layer four of the OSI model and said second layer is layer two of the OSI model.

4. The method of claim 1 further comprising the step of:
   determining a second quality of a second link from said electronic device by examining a third layer of a second protocol stack used to implement said second link that is different from a fourth layer of said second protocol stack that is used to deliver said packets.

5. The method of claim 4 wherein at least one of said first quality and second quality is based on at least one of the measurements of reachability and availability of a given service used for delivery of said packets.

6. The method of claim 4 further comprising the step of delivering said packets over the one of said two links based on a determination of which link has a more desirable quality.

7. The method of claim 6 wherein said determination is based, at least in part, on which link has the least financial cost for carrying said packets.

8. The method of claim 6 wherein said determination is based, at least in part, on whether a change from one of said links to the other of said links will be transparent to the performance of a given service being used for delivery of said packets.

9. The method of claim 1 wherein said determined quality is a transmission profile.

10. The method of claim 9, wherein said transmission profile is a record of successful transmissions from said device or of signal strengths for a previous time period.

11. The method of claim 10, wherein developing said retry strategy comprises identifying portions of said previous time period during which successful transmissions are recorded in said transmission profile.

12. The method of claim 11, wherein said retry strategy comprises retransmitting said at least one packet during portions of a subsequent time period corresponding to said identified portions.

13. The method of claim 1 wherein developing a retry strategy comprises determining whether a signal strength has increased by a predetermined amount.

14. The method of claim 1, comprising delivering packets over at least one of two links connected to the electronic device, comprising the steps of:
   determining a quality of all of said links by examining signal strength information inherently available over the second layer of said protocol stack, said second layer being employed by all of said links;
   developing a retry strategy for each of said links for use in transmitting said packets based on said determined qualities,
   selecting one of said links based on which of said retry strategies results in a desired successful transmission;
   retransmitting said at least one packet according to said retry strategy of said selected one of said links;
   resuming said method at said transmitting step over said selected one of said links using said retry strategy if said re-transmitting step succeeds; and
   terminating said method if said re-transmitting steps fails.

15. An electronic device operable to communicate with at least one node via a link comprising:
   a transmitter configured to transmit at least one packet over said link via a first layer of a protocol stack used to implement said link;

a computing processor connected to said transmitter configured to determine, prior to causing said transmitter to transmit further packets, whether transmission of said at least one packet failed;

said computing processor further configured to cause said transmitter to repeat said transmission until said transmission is determined to have failed;

said computing processor further configured to determine, responsive to said transmitter failing to effect said transmission, a quality of said link by examining signal strength information available over a second layer of said protocol stack; said second layer being a lower layer in said protocol stack than said first layer;

said computing processor further configured to develop a retry strategy for transmitting based on said determined quality; and said computing processor further configured to cause said transmitter to retransmit said at least one packet via said first layer according to said retry strategy.

16. The device of claim 15 wherein said device is further operable to resume transmission of said packets according to said retry strategy if retransmission of said at least one of said packets succeeds, and further operable to terminate transmission of packets if retransmission of said at least one of said packets fails.

17. The device of claim 15 wherein said first layer is layer four of the OSI model and said second layer is layer two of the OSI model.

18. The device of claim 15 wherein said device is further operable to determine a quality of a second link between said electronic device and a second node by examining a third layer of a second protocol stack used to implement said second link that is different from a fourth layer of said second protocol stack that is used to deliver said packets.

19. The device of claim 18 wherein said device is further operable to deliver said packets over the one of said two links based on a determination of which link has a more desirable quality.

20. The device of claim 19 wherein said determination is based, at least in part, on which link has the least financial cost for carrying said packets.

21. The device of claim 15 wherein said computer processor develops said retry strategy based on the determined quality of the link in order to develop the strategy as a transmission profile.

22. The device of claim 21, wherein said transmission profile is a record of successful transmissions from said device or of signal strengths for a previous time period.

23. The electronic device of claim 22, said computing processor further configured to develop said retry strategy by identifying portions of said previous time period during which successful transmissions are recorded in said transmission profile.

24. The electronic device of claim 23, wherein said retry strategy comprises retransmitting said at least one packet during portions of a subsequent time period corresponding to said identified portions.

25. The electronic device of claim 15, said computing processor further configured to develop said retry strategy by determining whether a signal strength has increased by a predetermined amount.

26. The device of claim 15 wherein said transmitter is configured to deliver packets over at least one of two links from said electronic device and said computer processor is further configured to determining a quality of all of said links by examining signal strength information inherently available over the second layer of said protocol stack, said second layer being employed by all of said links;

said computer processor further configured to develop a retry strategy for each of said links for use in transmitting said packets based on said determined qualities;

said computer processor further configured to select one of said links based on which of said retry strategies results in a desired successful transmission;

said transmitter configured to re-transmit said at least one packet according to said retry strategy of said selected one of said links;

said computer processor and said transmitter configured to resume said transmitting over said selected one of said links using said retry strategy if said re-transmitting succeeds; and said computer processor and said transmitter further configured to terminate transmitting if said retransmitting fails.

27. A non-transitory computer-readable storage medium containing a set of instructions executable by a processor to control an electronic device, comprising the steps of:

transmitting at least one packet over said link via a first layer of a protocol stack employed by said link;

determining, prior to transmitting further packets, whether transmission of said at least one packet failed;

repeating said transmitting and determining steps until said transmitting step is determined to have failed;

determining, responsive to said transmitting step failing, a quality of said link at said electronic device by examining signal strength information available within a second layer of said protocol stack; said second layer being a lower layer in said protocol stack than said first layer;

developing a retry strategy for said transmitting step based on said determined quality; and, retransmitting said at least one packet via said first layer according to said retry strategy.

* * * * *